(12) United States Patent
Koyama

(10) Patent No.: US 6,995,955 B2
(45) Date of Patent: Feb. 7, 2006

(54) PIVOT ASSEMBLY FOR HARD DISK DRIVE USE

(75) Inventor: Toshisada Koyama, Miyota-machi (JP)

(73) Assignee: Minebea Co., Ltd, Nagano (JP)

(*) Notice: Subject to any disclaimer, the term of this patent is extended or adjusted under 35 U.S.C. 154(b) by 101 days.

(21) Appl. No.: 10/656,740

(22) Filed: Sep. 5, 2003

(65) Prior Publication Data

US 2004/0136116 A1 Jul. 15, 2004

(30) Foreign Application Priority Data

Sep. 10, 2002 (JP) .......................... 2002-264638

(51) Int. Cl.
*G11B 21/08* (2006.01)

(52) U.S. Cl. ..................... 360/265.6; 384/546; 384/547
(58) Field of Classification Search .............. 360/265.6, 360/265.2, 265.4; 384/510, 537, 543, 544, 384/546, 547

See application file for complete search history.

(56) References Cited

U.S. PATENT DOCUMENTS

| 5,161,077 | A | * | 11/1992 | Jabbari .................... 360/265.6 |
| 5,283,704 | A | * | 2/1994 | Reidenbach .............. 360/264.3 |
| 5,482,381 | A | * | 1/1996 | Krum et al. ................. 384/480 |
| 5,529,404 | A | * | 6/1996 | Robinson et al. ........... 384/121 |
| 6,018,441 | A | | 1/2000 | Wu et al. |
| 6,371,654 | B1 | * | 4/2002 | Misso ........................ 384/499 |
| 6,406,191 | B1 | | 6/2002 | Koyama et al. |
| 6,519,116 | B1 | | 2/2003 | Lin et al. |
| 6,631,053 | B1 | | 10/2003 | Chew |
| 6,687,092 | B2 | | 2/2004 | Kan et al. |

* cited by examiner

*Primary Examiner*—Robert S. Tupper
(74) *Attorney, Agent, or Firm*—John J. Skinner, Jr.; Joel E. Lutzker; Schulte Roth & Zabe

(57) ABSTRACT

An apparatus for a pivot assembly that can strongly and reliably fix a sleeve to an outer ring, and in addition, that can also solve the problem of out gas. Ball bearing 2 are mated to both ends of a shaft 1, and to the outer circumference of these ball bearings 2, an inner wall part 31 mates a sleeve disposed between both ball bearings 2, and the sleeve 3 was fixed by laser welding to the outer ring 22 of the bell bearings 2.

5 Claims, 3 Drawing Sheets

PIVOT ASSEMBLY FOR HARD DISK DRIVE USE

CROSS-REFERENCE TO RELATED APPLICATIONS

This application claims priority from Japanese Patent Application No. 2002-264638 filed on Sep. 10, 2002.

BACKGROUND OF THE INVENTION

1. Field of the Invention

The present invention relates to an apparatus for a pivot assembly used as the bearing of a swing arm type actuator in a hard disk drive, and more particularly to the improvement of the fixing means of a sleeve that maintains the spacing of two ball bearings.

2. Description of the Related Art

The kind of pivot assembly that fixes ball bearings at both ends of a shaft and, in addition, mates a sleeve to the outer circumference of the ball bearings, and maintains by the bottom wall part of the sleeve a space between both ball bearings is known. This pivot assembly is mated to the base part of a swing arm having a magnetic head on the tip, and is attached by means of a screw passed through the swing arm to a screw hole formed in the sleeve.

Now, in the above-mentioned conventional pivot assembly the outer ring of the ball bearing and the sleeve were fixed by an adhesive. Because of this, the problem arose that gas would be generated from the adhesive that would result in a harmful effect on the surface of the hard disk and magnetic head. In order to solve this outgassing problem, even pressing of the outer ring into a sleeve and fixing was carried out. However, with fixing by pressing in, management of the allowance for pressing in was difficult and there was the problem that the reliability of the fixing of the sleeve was deficient.

Consequently, the present invention aims to offer a pivot assembly that can reliably and securely fix a sleeve and, in addition, can also solve the problem of outgassing.

SUMMARY OF THE INVENTION

Accordingly, the present invention is directed to a pivot assembly for hard disk drive use in which ball bearings are mated to both ends of a shaft, an inner wall part extending to the outer circumference of these ball bearings is mated to a sleeve disposed between both of the ball bearings, and in which the sleeve is fixed by laser welding to the outer ring of the ball bearing.

In this pivot assembly for hard disk drive use (hereinafter, called simply, "pivot assembly") of the above-mentioned configuration, because the sleeve is fixed by laser welding to the outer ring, the sleeve can be reliably and securely fixed, and, moreover, the problem of outgassing can be solved.

There is no limit on the laser source of the laser welding; for example, a YAG laser can be used. Furthermore, laser welding can be carried out along the entire circumference of the point of contact of the outer ring with the sleeve (seam weld), or can be carried out at multiple places mutually separated along the contact part (spot weld).

When welding a sleeve to the outer ring of a ball bearing, spot welding cannot be used, because with spot welding by means of electric resistance welding and gas welding, the welding part greatly lowers the bearing precision due to the thermal effect. In the present invention, because the sleeve is welded to the outer ring by means of laser welding, the weld part can be made smaller by narrowing the spot diameter of the laser beam to, for example, about 0.4 mm. In this manner, the thermal effect that the weld part imparts to the outer ring is reduced, and a reduction in bearing precision can be prevented.

Furthermore, the sleeve and the outer ring can be welded at the boundary of the end face of the outer ring and the inner circumference of the sleeve. However, because it is normal for the outer ring to have a cross-section abbreviated circular arc-shaped chamfer at the intersection of the outer circumference face and end face thereof, a concave part is formed between the edge part of the end face of the outer ring and the sleeve. In this case, the gap becomes smaller toward the inner part of the concave part, and a laser beam must correctly hit the contact part of the sleeve and outer ring positioned in the innermost part thereof. Moreover, the laser beam must irradiate so as to follow the common tangent of the chamfer and the inner circumference of the sleeve, in short, the inner circumference of the sleeve. If the laser beam is of a small diameter as mentioned above, when the position of the sleeve fluctuates even slightly, the laser beam cannot irradiate the necessary place, and so laser welding is not easy.

The present invention, including its features and advantages, will become more apparent from the following detailed description with reference to the accompanying drawings.

DETAILED DESCRIPTION

In one mode of the present invention, a concave part that reaches up to the vicinity of the outer circumference of the outer ring is formed, and the bottom wall of this concave part is laser welded to the outer circumference of the outer ring. With this kind of mode, if the laser beam is irradiated to any place on the bottom wall of the concave part, laser welding is carried out. Consequently, since the irradiation angle and the irradiation position of the laser beam do not need to be strictly controlled, laser welding can be easily carried out. However, in order to cause the bottom wall to be welded by a laser beam narrowed as mentioned above, it is desirable that its thickness be 0.3 mm or less. Here, the concave part can be made as a groove that extends along the entire circumference of the sleeve. In this case, welding that extends along the entire circumference of the groove can be done, or spot welding at multiple places mutually separated along the circumferential direction can be done. Furthermore, in the case of forming a sleeve, in order to ensure the strength of the sleeve, it is desirable that the thickness of the bottom wall be 0.1 mm or more. It is even acceptable if in the concave part holes are provided mutually separated in the circumferential direction of the sleeve, and spot welding at one or two or more places of the bottom walls of those holes can also be done.

In another mode to make laser welding easy, holes are formed on the outer circumference of a sleeve, linked to the outer circumference of the outer ring, and the edge part of these holes are laser welded to the outer circumference of the outer ring. In this case also, since laser welding can be carried out it a laser beam is irradiated to any place of the edge part of the hole, and since strict control of the irradiation angle and irradiation position of the laser beam is not necessary, laser welding can be easily carried out. Furthermore, with this kind of mode, there is also the advantage that, different from the case of forming the groove, the strength of the sleeve, practically, does not decrease.

Carrying out the above-mentioned kind of laser welding at places separated in the axial direction from the rolling groove of the outer ring is desirable. By this means, the thermal effect on the rolling groove and balls due to the laser welding can be reduced, and the bearing precision can be improved.

Figure 1:
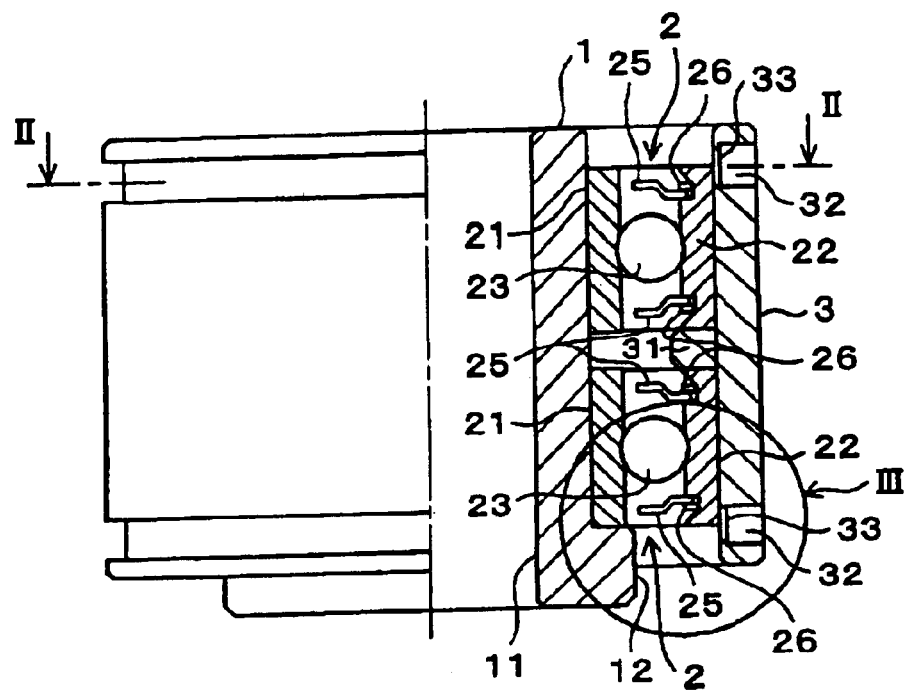
FIG. 1 is a side cross-section view that shows the pivot assembly of the first embodiment of the present invention.
Figure 2:
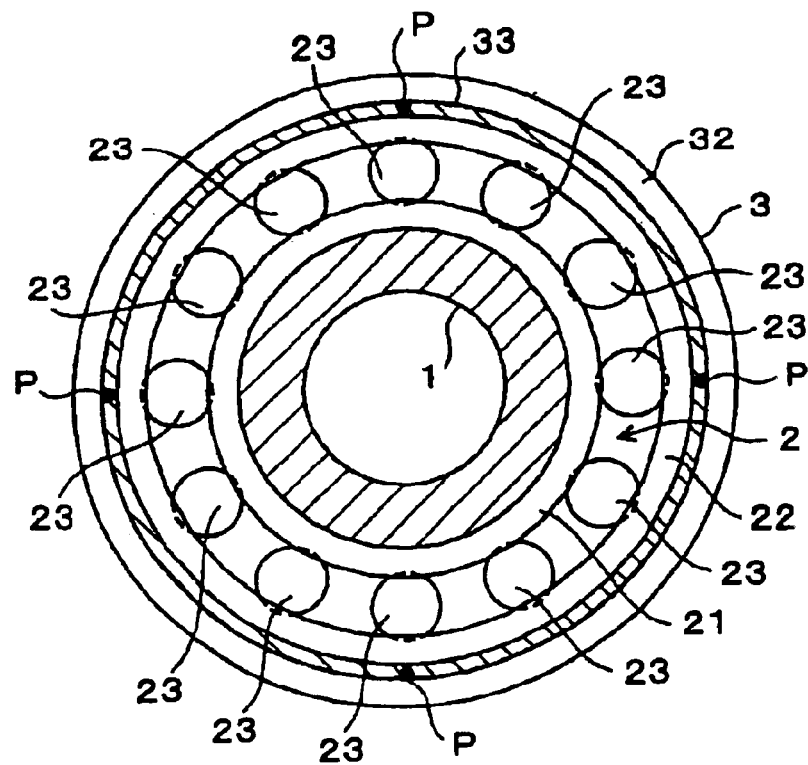
FIG. 2 is a cross-section view of 11—II of FIG. 1.
Figure 3:
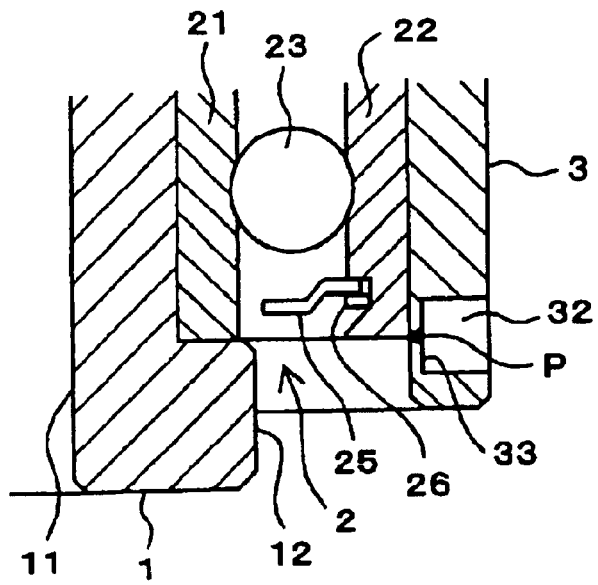
FIG. 3 is an enlarged side cross-section view of the part indicated by arrow III of FIG. 1.

The first embodiment of the present invention will be explained with reference to FIG. 1~FIG. 3. Reference numeral 1 in these figures is a shaft. A hole 11 is formed in the center of the shaft 1 and, by means of a shaft passed through this hole 11; a pivot assembly is attached to a hard disk drive. A flange 12 is formed at the lower end part of the shaft 1. On the outer circumference of the shaft 1, the ball bearing 2 caused to contact the end face is caused to mate with the flange 12.

A ball bearing 2 is provided with an inner ring 21 and an outer ring 22 and multiple balls 23 which can move by rolling in a circumferential direction between them. The balls 23 are maintained at regular intervals in a circumferential direction by means of a retainer that is not illustrated. The opening part between the inner ring 21 and the outer ring 22 is blocked by a seal 25. Furthermore, reference numeral 26 in the figures is a snap ring to fix the seal 25.

A ball bearing 2 the same as mentioned above is caused to mate with the upper end part of the shaft 1. Also, a sleeve 3 is caused to mate with the outer circumference of these two ball bearings 2. The sleeve 3 forms a cylindrical shape, and in the center part in the axial direction thereof, a spacer part (inner wall part) 31 with an inner diameter smaller than both end parts is formed. At both end faces of the spacer part 31, the outer rings 22 of ball bearings 2 make contact, and by means of this, the outer rings 22 are separated from each other by a fixed interval. Furthermore, on the outer circumference of both end parts of the sleeve 3, a groove (concave part) 32 that reaches to the vicinity of the outer circumference of the outer rings 22 is formed along the entire circumference. The center of the bottom wall 33 of the groove 32 is caused to correspond to the end face of the outer ring 22. And, the center of the bottom wall 33 is laser welded to the edge part of the outer ring 22 at multiple places separated at regular intervals in the circumferential direction, and, by means of this, the sleeve 3 is fixed to the outer ring 22. Reference numeral P in FIG. 2 indicates the nugget due to welding. Furthermore, seam welding along the entire circumference of the center of the bottom wall 33 is also possible.

To the outer circumference of a pivot assembly of the abovementioned configuration the base of a swing arm provided with a magnetic head on the tip is attached. In the base of the swing arm, a hole that mates the pivot assembly is formed, and a screw passed through the above-mentioned base is screwed in a screw hole (omitted from the figure) formed in the sleeve 3.

In a pivot assembly of the above-mentioned constitution, because the sleeve 3 is fixed by laser welding to the outer ring 22, the sleeve can be reliably and securely fixed, moreover, the problem of outgassing can be solved.

In particular, in the above-mentioned first embodiment, in the outer circumference of the sleeve 3, a groove 32 that reaches up to the vicinity of the outer circumference of the outer ring 22 is formed, and because the bottom wall 33 of this groove 32 is laser welded to the outer circumference of the outer ring 22, strictly controlling the irradiation angle and irradiation position of the laser beam is not necessary; thus, laser welding can be easily carried out. Furthermore, since the laser welding is carried out at a place furthest separated from the rolling groove of the ball bearing 2, there is no thermal effect with respect the rolling groove and balls 23, and bearing precision can be improved.

Figure 4:
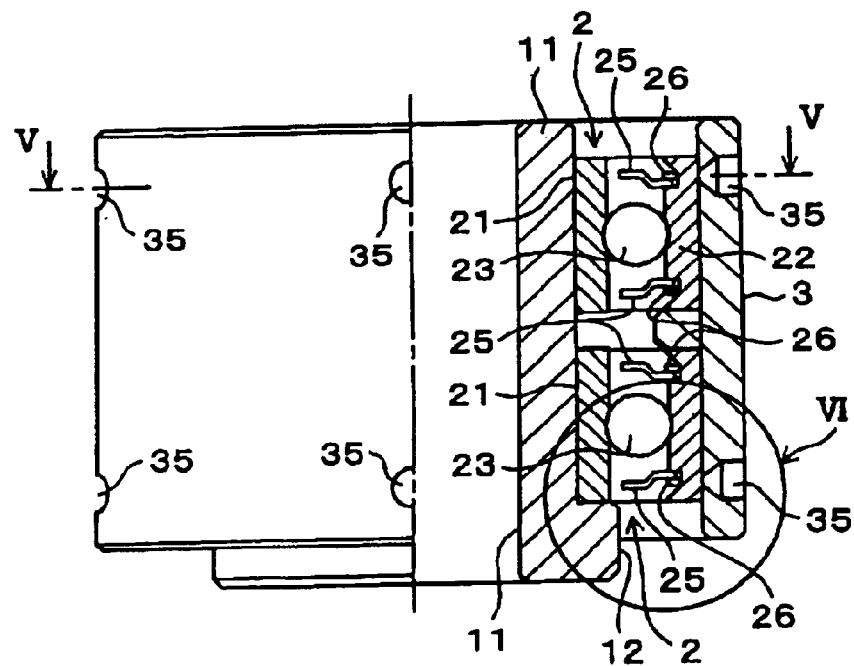
FIG. 4 is a side cross-section view that shows the pivot assembly of the second embodiment of the present invention.
Figure 5:
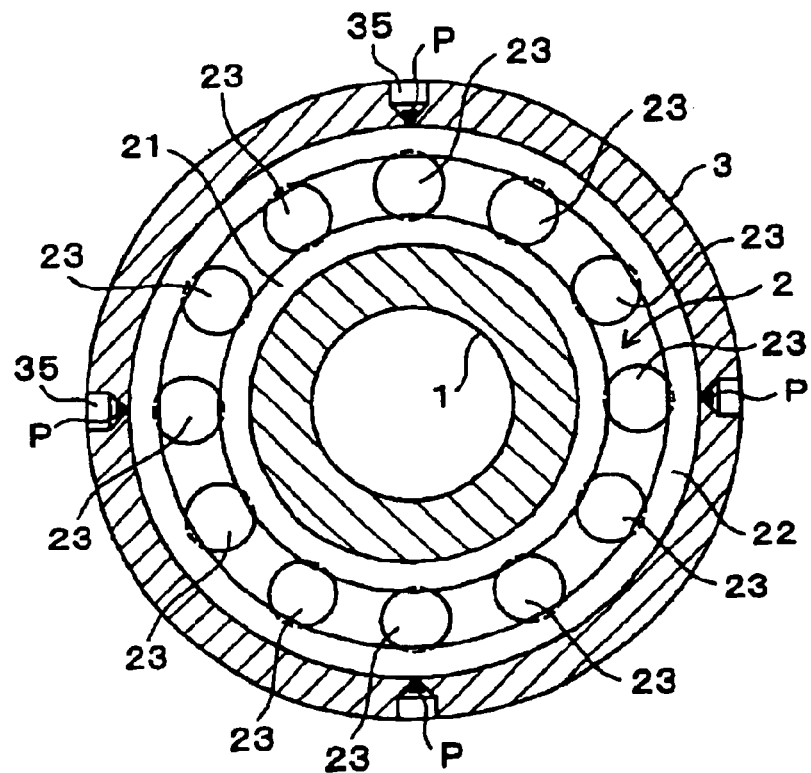
FIG. 5 is a cross-section view of the V—V line of FIG. 4.
Figure 6:
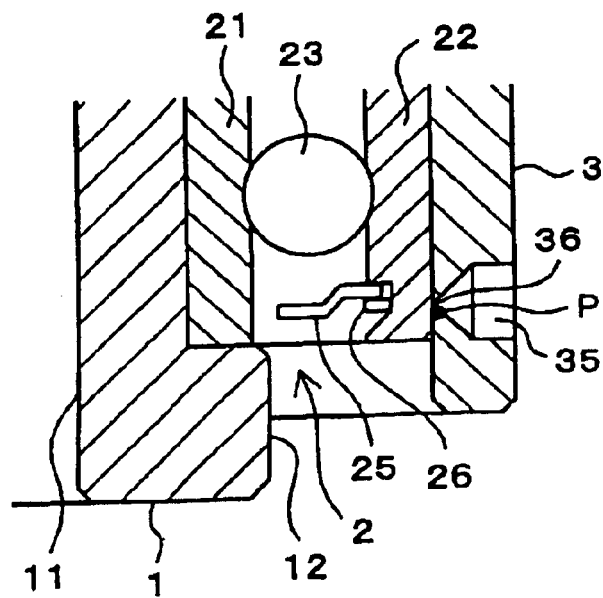
FIG. 6 is an enlarged side cross-section view of the part indicated by arrow VI of FIG. 4.

Next, the second embodiment of the present invention will be explained with reference to FIG. 4~FIG. 6. The second embodiment differs from the first embodiment on the point that a hole 35 was formed, instead of the groove 32 of the first embodiment. Accordingly, in the following explanation, the same reference numerals were given to the constituent elements that are the same as those of the above-mentioned first embodiment and the explanation thereof is omitted.

As shown in the figure, on the outer circumference of both end parts of the sleeve 3, multiple holes (concave part) 35 are formed at regular intervals in a circumferential direction. The tip of the hole 35 forms a tapered shape, and at this tip, an opening 36 that links to the outer circumference of the outer ring 22 is formed. The opening 36 is positioned in a place that approaches the ball 23 side from the end face of the outer ring 22. And, the edge part of the opening 36 is laser welded to the outer circumference of the outer ring 22 at one place or the entire circumference thereof, and by means of this, the sleeve 3 is fixed to the outer ring 22.

In the second embodiment, the action and effect equal to that of the above-mentioned first embodiment can also be obtained. Particularly, in the second embodiment, there is the advantage that there is essentially no decrease in the strength of the sleeve 3, compared to the case of forming a groove 32, as in the first embodiment, because a hole 35 that links to the outer circumference of the outer ring 22 is formed.

According to the present invention as explained above, because a sleeve is fixed by laser welding to the outer ring of a ball bearing, the sleeve can be reliably and securely fixed; moreover, the problem of outgassing can be solved and like effects can be obtained.

In the foregoing description, the apparatus and method of the present invention have been described with reference to specific examples. It is to be understood and expected that variations in the principles of the apparatus and method herein diaclosed may be made by one skilled in the art and it is intended that such modifications, changes, and substitutions are to be included within the scope of the present invention as set forth in the appended claims. The specification and drawings are accordingly to be regarded in an illustrative rather than in a restrictive sense.

What is claimed:

1. An apparatus for a pivot assembly for hard disk drive use comprising:

two ball bearings, each comprising an outer ring;

a shaft, wherein said ball bearings have been mated with both ends of the shaft;

an inner wall part, mounted on the shaft, and extending to an outer circumference of the outer ring of each of said ball bearings; and a sleeve, disposed between both of said ball bearings, and mated to the inner wall part, wherein said sleeve is fixed by means of laser welding to the outer rings of said ball bearings, wherein said sleeve further comprises a concave part formed in the outer circumference of said sleeve and having a bottom wall in the vicinity of the outer circumference of said outer rings, and wherein the bottom wall of this concave part is laser welded with the outer circumference of said outer rings.

2. The apparatus according to claim 1, wherein the concave part is a groove that extends along the entire circumference of said sleeve.

3. The apparatus according to claim 2, wherein the concave part is comprises of holes separated from each other in the circumferential direction of said sleeve.

4. An apparatus for a pivot assembly for hard disk drive use comprising:

two ball bearings, each comprising an outer ring;

a shaft, wherein said ball bearings have been mated with both ends of the shaft;

an inner wall part, mounted on the shaft, and extending to an outer circumference of the outer ring of each of said ball bearings; and a sleeve, disposed between both of said ball bearings, and mated to the inner wall part, wherein said sleeve is fixed by means of laser welding to the outer rings of said ball bearings, wherein the sleeve further comprises a hole extending from the outer circumference of said sleeve to the outer circumference of said outer rings, and wherein the edge part of this hole is laser welded to the outer circumference of said outer rings.

5. The apparatus according to claim 4, further comprising a rolling groove in the outer rings of the ball bearings, wherein said laser welding is carried out at places on the outer rings separated in the axial direction from the rolling groove of said outer rings.

* * * * *